United States Patent
Dahl et al.

(10) Patent No.: US 11,972,466 B2
(45) Date of Patent: Apr. 30, 2024

(54) COMPUTER STORAGE MEDIA, METHOD, AND SYSTEM FOR EXPLORING AND RECOMMENDING MATCHING PRODUCTS ACROSS CATEGORIES

(71) Applicant: ADOBE INC., San Jose, CA (US)

(72) Inventors: Jonas Dahl, Basal (CH); Mausoom Sarkar, Noida (IN); Hiresh Gupta, Noida (IN); Balaji Krishnamurthy, Noida (IN); Ayush Chopra, Delhi (IN); Abhishek Sinha, Noida (IN)

(73) Assignee: ADOBE INC, San Jose, CA (US)

( * ) Notice: Subject to any disclaimer, the term of this patent is extended or adjusted under 35 U.S.C. 154(b) by 572 days.

(21) Appl. No.: 16/417,373

(22) Filed: May 20, 2019

(65) Prior Publication Data

US 2020/0372560 A1    Nov. 26, 2020

(51) Int. Cl.
*G06Q 30/0601* (2023.01)
*G06F 16/583* (2019.01)

(52) U.S. Cl.
CPC ..... *G06Q 30/0625* (2013.01); *G06F 16/5854* (2019.01)

(58) Field of Classification Search
CPC .............. G06Q 30/0631; G06Q 30/06; G06Q 30/0601–0643; G06V 20/60–90; G06V 20/50–60; G06V 10/768; G06V 10/07; G06F 16/5854
See application file for complete search history.

(56) References Cited

U.S. PATENT DOCUMENTS

| | | | | |
|---|---|---|---|---|
| 10,109,051 | B1* | 10/2018 | Natesh | G06V 20/10 |
| 11,037,071 | B1* | 6/2021 | Tekiela | G06N 20/00 |
| 11,645,693 | B1* | 5/2023 | Lin | G06F 17/16 |
| | | | | 705/26.64 |
| 2017/0286372 | A1* | 10/2017 | Chellam | G06F 40/134 |
| 2018/0130114 | A1* | 5/2018 | Hawkins | G06F 18/24 |
| 2019/0156395 | A1* | 5/2019 | Bessega | G06Q 30/02 |
| 2019/0184288 | A1* | 6/2019 | Velic | G06K 9/6256 |

(Continued)

OTHER PUBLICATIONS

McAuley, J. et al. "Image-Based Recommendations on Styles and Substitutes." In Proceedings of the 38th International ACM SIGIR Conference on Research and Development in Information Retrieval (SIGIR '15). Association for Computing Machinery, New York, NY, USA, 43-52. (Year: 2015).*

(Continued)

*Primary Examiner* — Marissa Thein
*Assistant Examiner* — Katherine A Barlow
(74) *Attorney, Agent, or Firm* — Shook, Hardy & Bacon L.L.P.

(57) ABSTRACT

A search system provides search results with images of products based on associations of primary products and secondary products from product image sets. The search system analyzes a product image set containing multiple images to determine a primary product and secondary products. Information associating the primary and secondary products are stored in a search index. When the search system receives a query image containing a search product, the search index is queried using the search product to identify search result images based on associations of products in the search index, and the result images are provided as a response to the query image.

17 Claims, 9 Drawing Sheets

(56) References Cited

U.S. PATENT DOCUMENTS

| | | | |
|---|---|---|---|
| 2020/0117938 A1* | 4/2020 | Greenberger | G06Q 30/0633 |
| 2020/0134694 A1* | 4/2020 | Park | G06Q 30/0631 |
| 2020/0193206 A1* | 6/2020 | Turkelson | G06K 9/00671 |
| 2020/0265495 A1* | 8/2020 | Cho | G06F 16/5854 |

OTHER PUBLICATIONS

Mohan, A. et al. "Example-based object detection in images by components," in IEEE Transactions on Pattern Analysis and Machine Intelligence, vol. 23, No. 4, pp. 349-361, doi: 10.1109/34.917571. (Year: 2001).*

Babenko, A., et al. "The Inverted Multi-Index," in IEEE Transactions on Pattern Analysis and Machine Intelligence, vol. 37, No. 6, pp. 1247-1260, doi: 10.1109/TPAMI.2014.2361319. (Year: 2015).*

* cited by examiner

COMPUTER STORAGE MEDIA, METHOD, AND SYSTEM FOR EXPLORING AND RECOMMENDING MATCHING PRODUCTS ACROSS CATEGORIES

BACKGROUND

Search systems provide multiple methods to enable consumers to explore product catalogs of a retailer to locate products they are interested in purchasing. For instance, conventional search systems allow consumers to search for products using keyword searches or browsing through categories to locate products with particular colors, patterns, or other attributes. However, the search results of conventional search systems may not reflect what a user is looking for. In some cases, search systems use techniques to recommend similar items and/or products to a consumer based on items and/or products the consumer has viewed in the past or the activity of other consumers looking for similar products. Still, when determining product recommendations, conventional search systems may not consider all features of a product, and the search results may be visually diverse compared to the product of interest to a consumer.

Some search systems employ visual search techniques, but limitations in these techniques result in the search systems failing to provide adequate search results. In particular, while image recognition tasks are easily performed by humans, such tasks are extremely difficult for computers. For example, humans are able to identify objects in images even when the objects are positioned differently, seen from various angles, or contain additional objects in the image. Particularly, a human will have no problem knowing that two images contain the same article of clothing even when the article is shown at a different angle or on a different model. Conventional visual search algorithms search for images with an overall similarity to the image considering all objects in the image. These traditional visual search algorithms may produce inaccurate results because the images are visually dissimilar even though the products in the image are the same. As a result, conventional methods may not find images containing visually similar products that have additional objects in the images.

SUMMARY

Embodiments of the present invention relate to, among other things, providing search results based on an association of products in a product image set. At a high level, embodiments of the present invention receive a product image set and identify primary and secondary products in the image set in order to generate a search index. In order to generate the search index, isolated product images within the product image set are located and an object detector is used to identify the product in the isolated product image as the primary product. Additionally, images containing multiple products are identified and the object detector identifies the products in the images that do not match the primary product. The non-matching products are identified as the secondary products and indexed with the primary product. Furthermore, once the primary and secondary products are identified, the categories of the products are determined using a trained classifier and indexed with the corresponding product in the search index. Descriptive feature vectors of each secondary product are generated and used as the primary key of the search index.

To search for and provide search results as product recommendations, a query image containing one or more search products can be used to identify corresponding products in the search index. To query the search index, the descriptive feature vector of the product in the query image is generated and used to search for products with matching descriptive feature vectors in the search index. Result images containing products that have complementary and/or matching categories may be provided from the search index based on the results of the query.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Definitions

Figure 1:
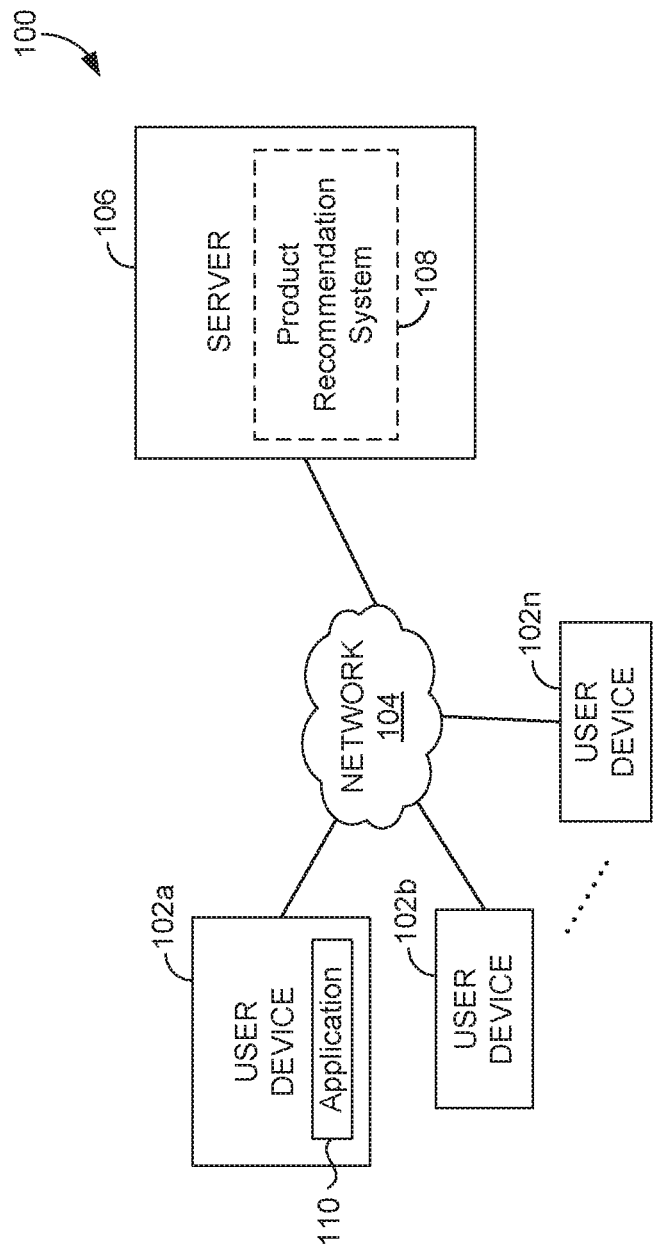
FIG. 1 is a block diagram of an exemplary computing system for providing product recommendations, in accordance with embodiments of the present invention.

Various terms are used throughout this description. Definitions of some terms are included below to provide a clearer understanding of the ideas disclosed herein.

A "product catalog" generally refers to a collection of one or more product image sets.

As used herein, a "product image set" generally contains multiple images containing a primary product and one or more secondary products. A product image set may be associated with a particular product catalog or multiple product catalogs. A "primary product" of a product image set comprises the product that is the focus of the product image set, and as such, typically appears in each image of the product image set. A "secondary product" of a product image set comprises a product that is shown in one or more of the images in the product image set with the primary product. Each product image set may contain any combination of isolated product images (i.e., images containing the primary product only) and images containing a primary product with one or more secondary products. For example, if the primary product is a t-shirt, the product image set may contain at least one isolated product image of the t-shirt as well as multiple images of models wearing the t-shirt along with other secondary products such as jeans or pants.

A "descriptive feature vector" generally refers to a collection of features extracted from an image that describe a particular product located in the image. The descriptive feature vector of a particular product can be of any size or dimension.

As used herein, a "query image" generally refers to any image that contains any number of products that can be used as input to search for products in a search index that are similar to, complement, correspond, match, or otherwise associate with the products in a query image. A query image may contain any number of search products that can be indicated for selection to search for in the search index. A query image may be uploaded by a user or automatically selected and/or determined.

Overview

While search systems are available to search product catalogs, conventional search system fall short in a number of ways. For instance, conventional search systems allow consumers to search for products using keyword searches or browsing through categories to locate products with particular colors, patterns, or other attributes. However, the search results of conventional search systems may not reflect what a user is looking for. In some cases, search systems use techniques to recommend similar items and/or products to a consumer based on items and/or products the consumer has viewed in the past or the activity of other consumers looking for similar products. Still, when determining product recommendations, conventional search systems may not consider all features of a product, and the search results may be visually diverse compared to the product of interest to a consumer.

Typically, search systems employ visual search techniques, but limitations in these techniques result in the search systems failing to provide adequate search results. In particular, while image recognition tasks are easily performed by humans, such tasks are extremely difficult for computers. For example, humans are able to identify objects in images even when the objects are positioned differently, seen from various angles, or contain additional objects in the image. Particularly, a human will have no problem knowing that two images contain the same article of clothing even when the article is shown at a different angle or on a different model. However, conventional visual search algorithms may not produce accurate results in the context of recommending visually similar products to a consumer when an image contains multiple objects or the product has been changed in some way, shape, or form.

Generally, conventional computer-based visual search techniques search for images with an overall similarity to the image considering all objects in the image. These traditional visual search algorithms may produce inaccurate results because the images are visually dissimilar even though the products in the image are the same. As a result, conventional methods may not find images containing visually similar products that have additional objects in the images. For example, it may be difficult to find a similar product in an image if the image shows a model wearing the particular product and/or the image includes other products. Typical visual search algorithms fail to consider the product by itself but instead consider the image as a whole including features of the model and/or other products in the image. As such, conventional methods may not identify images containing visually similar products that have additional objects and/or features in the images.

Traditionally, consumers can use multiple well-known methods to explore product catalogs of a retailer to locate products they are interested in purchasing. Conventional search systems may use keyword searches to locate products with particular colors, patterns, or other attributes. However, the search results may not always reflect what a consumer is looking for. Other computer-based visual search techniques involve browsing categories and repeatedly refining search results until a desired product is found. However, these categories are often rigid and exploring each category may take an excessive amount of time. Furthermore, some prior techniques may recommend similar items based on what a consumer has viewed in past or the activity of other consumers looking for similar products. Still, other conventional methods recommend items and/or products that do not precisely consider all the features of a product. For example, even though a retailer may not have a particular product, it is still useful to offer consumers products from its catalog that are similar even in the absence of an exact match. As such, it is desirable for computer-based visual search techniques to accurately recommend visually similar products so consumers remain engaged and are more likely to purchase a product from the retailer.

Embodiments of the present invention are directed to a search system that addresses these technical challenges by providing search results based on associations of products detected in product image sets of a product catalog. Product catalogs are often configured to include a product image set for each product in the catalog. The product image set for a given product (i.e., the primary product for that product image set) typically includes an image of that primary product, as well as images of the primary product with other products (i.e., secondary products from that product image set). At a high level, embodiments of the present invention analyze the images in each product image set in a product catalog using object detection to individually identify a primary product and secondary products of each product image set. Associations between the primary product and secondary products from each product image set are stored in a search index. In some configurations, a descriptive feature vector is generated for each secondary product and indexed with data for a corresponding primary product in order to efficiently identify correlating products in the index.

The search index is employed by the search system for visual searches. In particular, a query image containing a search product can be received and used to query the search index in order to return image search results based on the associations between products stored in the search index. As a result, the search system is able to provide accurate search results. In some embodiments, a descriptive feature vector for a search product of a query image is generated and used to query the search index in order to identify primary and secondary products in the search index that correspond with the descriptive feature vector of the search product. In other embodiments, multiple search products may be identified in a single query image to allow selection of a particular search product without uploading a different image. Result images provided in response to the query image including products that are similar to, complement, correspond, match, or otherwise associate with the search product from the query image.

More specifically, the search system described herein initially analyzes images from product image sets to index information identifying associations among products. For each product image set, the search system analyzes the images in the product image set using a trained bounding box detector network or any other image object detector to identify each individual object in each image. To determine the primary product for the product image set, the search system may identify an isolated product image with only a single object detected. The single object is identified as the primary product. Each image with more than one object detected indicates multiple products in the image, including the primary product and at least one secondary product. Objects from those images that do not match the primary product may be identified as secondary products. As a result of the image analysis, the search system determines associations between each secondary product of a product image set and the primary product of the product image set.

Data is stored in a search index associating each secondary product with the primary product of each product image set. In some configurations, a descriptive feature vector is generated for each secondary product and stored in association with data for the primary product. Any suitable method and/or algorithm for generating a feature vector from an image may be used to generate the descriptive feature vector for each secondary product. Associating the descriptive feature vector for each secondary product with data for the primary product allows the index to efficiently be searched for correlating and/or matching descriptive feature vectors of different products in different images.

In other embodiments, the categories of each product in the product image set may be determined. A trained category prediction classifier may be used to determine the categories of each product. The isolated product images with only one bounding box may be passed through the classifier to determine the category of the primary product. For each remaining image in the same product image set which contain more than one product, the bounding box detector network may isolate each product and the category prediction classifier may determine the category of each isolated product. Therefore, for each product image set, the primary product has an associated category and each secondary product has an associated category.

In some configurations, a category of each product in a product image set may be determined when analyzing the images of the product image set. A trained category prediction classifier may be used to determine the categories of each product. This may include identifying a category of the primary product and each secondary product identified in a product image set. Therefore, for each product image set, the primary product has an associated category and each secondary product has an associated category. Information regarding the category of each product may be stored in the search index to facilitate searching.

The search system may query the search index to search for products in images that are similar, complement, correspond, match, or otherwise associate with a search product presented in a query image. When the search system receives a query image with a search product, a descriptive feature vector may be generated for the search product in the query image and used to identify result images in the search index that contain products based on correlating the descriptive feature vector of the search product with descriptive features vectors of products stored in the search index. In some configurations, the result images provided from the search index may be based on a category of the search product and the associated categories of products in the search index.

Accordingly, the search system described herein can provide search results based on querying a search index for products that are similar, complement, correspond, match or otherwise associate with a search product presented in a query image. As a result, the search system keeps consumers engaged by allowing them to upload their own images in order to find accurate product recommendations. Advantageously, the search system can accept an image uploaded by a consumer and embodiments of the present invention will determine visually similar products in a product catalog. In some embodiments, multiple products (e.g., an entire outfit composed of multiple apparel products) may be recommended that are similar, complement, match, correspond, or otherwise associate with the search product in a query image. Thus, the present technique provides an efficient way of exploring and searching product catalogs for accurate product recommendations.

Example Product Recommendation Environment

FIG. 1 depicts a block diagram of exemplary environment 100 suitable for use in implementing embodiments of the invention. Generally, environment 100 is suitable for providing product recommendations, and among other things, facilitates providing search results based on an association of primary products and secondary products from a product image set. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 9.

It should be understood that operating environment 100 shown in FIG. 1 is an example of one suitable operating environment. Among other components not shown, operating environment 100 includes a number of user devices, such as user devices 102a and 102b through 102n, network 104, and server(s) 106. Each of the components shown in FIG. 1 may be implemented via any type of computing device, such as one or more of computing device 900 described in connection to FIG. 9, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 9. By way of example and not limitation, a user device may be embodied as a personal computer (PC), a laptop computer, a mobile device, a smartphone, a tablet computer, a smart watch, a wearable computer, a personal digital assistant (PDA), a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 106 for providing product recommendations according to the present disclosure. In some implementations, the application(s) comprises a web application, which can run in a web browser, and could be hosted at least partially on the server-side of environment 100. In addition, or instead, the application(s) can comprise a dedicated application, such as an application having analytics functionality. In some cases, the application is integrated into the operating system (e.g., as a service and/or program). It is therefore contemplated herein that "application" be interpreted broadly. In some embodiments, the application may be integrated with product recommendation system 108.

In accordance with embodiments herein, the application 110 can facilitate providing search results based on an association of primary products and secondary products from a product image set. In particular, a product image set is analyzed to identify primary and secondary products. A search index is generated using descriptive feature vectors of each secondary product indexed with data for the primary product. The search index may be queried to identify corresponding products based on a search product in a query image. The result images identified in the search index based on the search product may be provided to display product recommendation. For example, application 110 can be used to provide product recommendations to a user of the user device 102a.

As described herein, server 106 can facilitate providing product recommendations to a user via product recommendation system 108. Server 106 includes one or more processors, and one or more computer-readable media. The computer-readable media includes computer-readable instructions executable by the one or more processors. The instructions may optionally implement one or more components of product recommendation system 108, described in additional detail below. It should be appreciated that while product recommendation system 108 is depicted as a single system, in embodiments, it can function as multiple systems capable of performing all the attributes of the system as described.

Product recommendation system 108 generally provides search results based on an association of primary products and secondary products from a product image set. Product recommendation system 108 can be implemented to associate primary and secondary products from a product image set. In this regard, the indexed set of primary and secondary products may be searched for corresponding products based on a search product in a query image and search results (i.e. images) may be provided. The search results may provide and/or include product recommendations.

For cloud-based implementations, the instructions on server 106 may implement one or more components of product recommendation system 108. Application 110 may be utilized by a user to interface with the functionality implemented on server(s) 106, such as product recommendation system 108. In some cases, application 110 comprises a web browser. In other cases, server 106 may not be required, as further discussed with reference to FIG. 2. For example, the components of product recommendation system 108 may be implemented completely on a user device, such as user device 102a. In this case, product recommendation system 108 may be embodied at least partially by the instructions corresponding to application 110.

Thus, it should be appreciated that product recommendation system 108 may be provided via multiple devices arranged in a distributed environment that collectively provide the functionality described herein. Additionally, other components not shown may also be included within the distributed environment. In addition, or instead, product recommendation system 108 can be integrated, at least partially, into a user device, such as user device 102a. Furthermore, product recommendation system 98 may at least partially be embodied as a cloud computing service.

Figure 2:
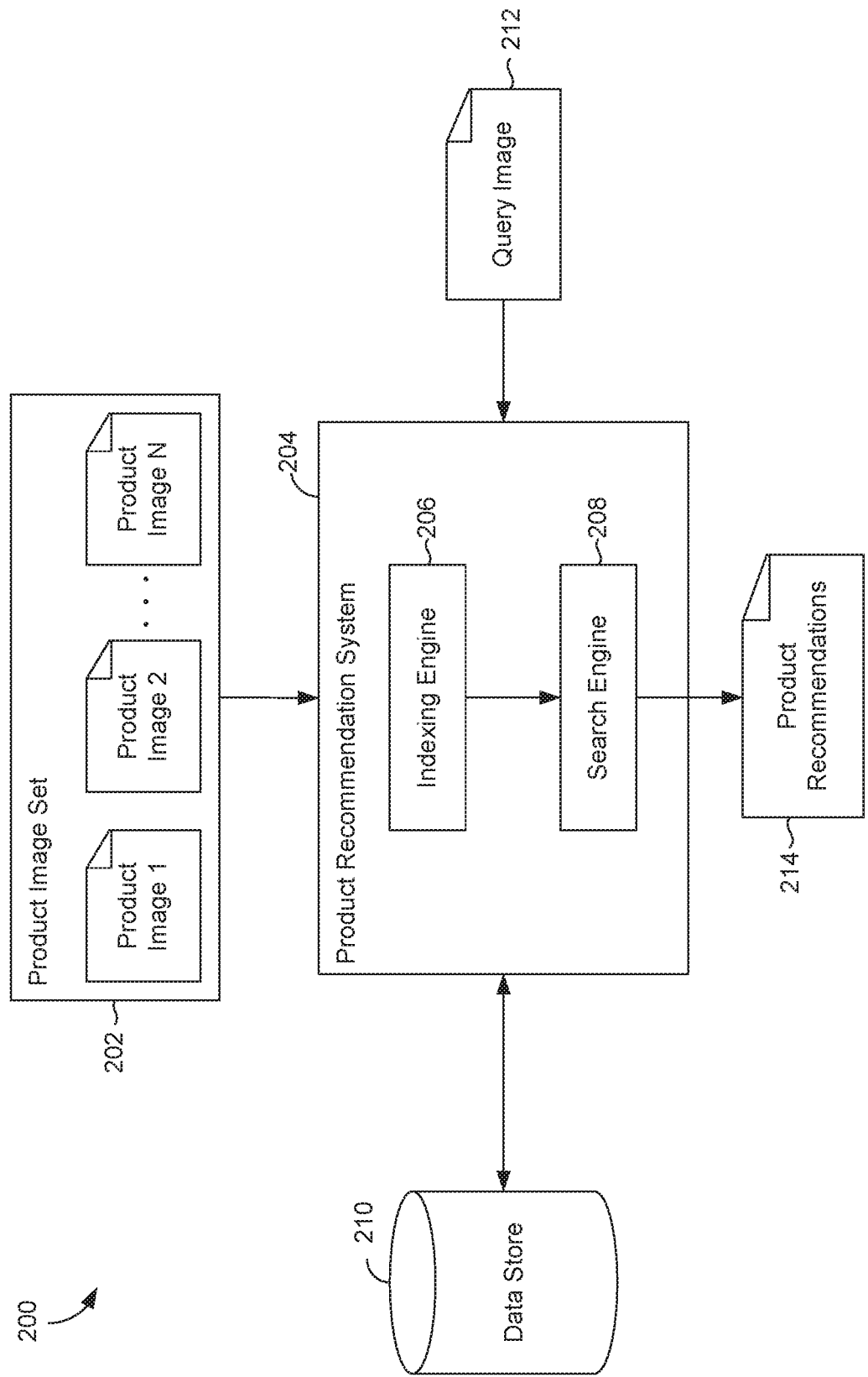
FIG. 2 is a block diagram of an exemplary computing system for providing product recommendations, in accordance with embodiments of the present invention.

Referring to FIG. 2, a block diagram is provided showing an illustrative product recommendation environment 200 for providing search results based on an association of primary products and secondary products from a product image set. Data store 210 can store computer instructions (e.g., software program instructions, routines, or services), data, and/or models used in embodiments described herein. In some implementations, data store 210 stores information or analytics data relating to products (e.g., product analytics data). Although depicted as a single component, data store 210 may be embodied as one or more data stores. Further, the information in data store 212 may be distributed in any suitable manner across one or more data stores for storage (which may be hosted externally).

In embodiments, data stored in data store 210 includes collected product analytics data. Product analytics data generally refers to any data collected regarding products or any other information about products. In some instances, product analytics data may be collected and/or provided by a particular manufacturer, retailer, website, user device, or portions thereof. As such product analytics data can include any information relating to products including, but not limited to, pricing, color, size, texture, fabric, pattern, and any other suitable characteristics, features, or attributes of a product. One example of the data store is ADOBE® Data Warehouse, which can store collected product analytics data. Product analytics data can be any other data collected from users in any suitable manner. In some cases, product analytics data can be received directly from user devices or from one or more data stores in the cloud. Such data can be received from and sent to product recommendation system 204. In other cases, data be received directly from user devices or form one or more data stores in the cloud.

Product recommendation system 204 can provide search results based on an association of primary products and secondary products from product image sets utilizing product analytics data, or any other data, associated with products gathered by a business intelligence, analytics program(s), data provider, user device, or any other product or service. This product analytics data can be utilized by the system to generate a search index based on a identifying primary and secondary products in a product image set. As such, the product recommendation system 204 is capable of providing product recommendations that are similar, complement, correspond, match, or otherwise associate with products in the search index based on a search product in a query image.

As an overview, product recommendation system 204 may receive a product image set, analyze the images in the set to identify primary and secondary products, and generate or otherwise update a search index based on the associations between the primary and secondary products. The search index may be queried using a descriptive feature vector for a search product of a query image in order to identify products in the search index that correspond with the descriptive feature vector of the search product. Result images containing products in the search index may be provided in response to the search product. The images provided as search results may be products that are similar to, complement, correspond, match, or otherwise associate with the search product from the query image.

In this way, to initiate providing product recommendations, product recommendation system 204 can receive a product image set 202. In some cases, the product image set 202 may be automatically provided. For instance, product image set 202 can be sent automatically when, for example, the webpage of a retailer or other website operator requests that product recommendations be provided for a particular product when the webpage loads. As another example, a product image set may be provided in response to a user selection and/or indication of a product in an image that they would like to find visually similar products. In other cases, a product image set may be provided any time a retailer or other user desires to display product recommendations.

Product image set 202 can include images depicting products. In some embodiments, there may be any number of product images containing products. Product image 1 through product image N can be any type of image (e.g., JPEG, PNG, TIFF BMP, GIF, etc.) that contains one or more products. By way of example, and not limitation, a product image in the product image set 202 may contain a single isolated product. In other instances, a product image in product image set 202 may contain multiple products. As such, product image set 202 contains more than one product. Product image set 202 can be used to provide product recommendations, discussed further below, with reference to indexing engine 206 and search engine 208. Various embodiments of product image set 202 are discussed further below in conjunction with at least diagram 300 of FIG. 3.

Product recommendation system 204 can include indexing engine 206 and search engine 208. The foregoing components of product recommendation system 204 can be implemented, for example, in operating environment 1000 of FIG. 1. In particular, these components may be integrated into any suitable combination of user devices 102*a* and 102*b* through 102*n*, and server(s) 106.

Indexing engine 206 of product recommendation system 204 is generally configured to identify products in product image sets, such as product image set 202, and generate or otherwise update a search index based on an association of primary and secondary products in each product image set. Indexing engine 206 initially analyzes the images from product image set 202 to identify products in the images using any suitable object detection method, process, algorithm, and/or model such as YOLO, RCNN, Fast RCNN, Mask RCNN, Multibox, etc. The indexing engine 206 also identifies a primary product and secondary products from the product image set. To identify the primary product, the indexing engine 206 may identify an isolated product image in the product image set 202 in which only a single object is detected. To identify secondary products using object detection, the images in the product image set 202 that contain two or more objects are identified. For each image that contains two or more objects, each object that does not match the primary product is identified as a secondary product. Object detection is used for each image in product image set 202 to identify all the secondary products. In this way, indexing engine 206 identifies the primary and secondary products of product image set 202 using object detection.

Indexing engine 206 indexes information regarding primary and secondary products identified from product image sets, such as product image set 202. In some configurations, the indexing engine generates a descriptive feature vector for each identified secondary product to index with data associated with the primary product. In other embodiments, the indexing engine may also generate a descriptive feature vector for the primary product. It is contemplated that any suitable method, process, algorithm, tool, and/or model may be used for generating the descriptive feature vector of an image such as SIFT, SURF, ORB, BRIEF etc. In embodiments, indexing engine 206 may use the descriptive feature vector generated for each secondary product as the primary key of the search index. As such, a primary product may be indexed with the descriptive feature vector of each of a plurality of secondary products. Further, multiple primary products may be indexed with the descriptive feature vectors of multiple secondary products. In this regard, the index is organized by associating the descriptive feature vectors of secondary products with data from one or more primary products.

In some configurations, indexing engine 206 may generate or otherwise update a search index with information identifying the categories of the primary and secondary products from product image sets, such as product image set 202. For example, a trained classifier may determine the category of each product identified from product image set 202. It is contemplated that any suitable method, process, algorithm, tool, and/or model may be used to determine the categories of product images such as a neural network, extreme learning machine, decision tree, support vector machine, etc. For example, a classifier may be trained on images of products of known categories. The classifier can then be used to identify a category for each product in product images from product image set 202. Information identifying the category (or multiple categories, in some instances) of the primary product and secondary products from product image set 202 can then be stored in the search index. In some embodiments, the descriptive feature vector for each secondary and primary product may be based on the identified category of each secondary product. In other words, the category of a product is used when generating a descriptive feature vector for the product such that the descriptive feature vector encodes the category.

Search engine 208 can query the search index generated by indexing engine 206 to provide product recommendations 214. For example, in some embodiments, search engine 208 may receive a query image 212 containing a search product. Query image 212 may be any type of image containing a product. For example, query image 212 may be an image uploaded from a user device containing a search product. As another example, query image 212 may be an image located on a retailer's website containing a search product, a model wearing a particular search product, and/or any image that contains multiple products. The search product in a query image 212 may be identified using any object detection method, process, algorithm, tool, and/or model as described above at least in conjunction with indexing engine 206. As such, search engine 208 of product recommendation system 204 can query the search index for products that are similar to, complement, correspond, match, or otherwise associate with the search product in query image 212.

In embodiments, search engine 208 may generate a descriptive feature vector for a search product in query image 212. In some embodiments, the descriptive feature vector of the search product may be generated and used to identify matching descriptive feature vectors of secondary products in the search index. The descriptive feature vectors of the search product may be generated using any method, process, algorithm, tool, and/or model as described above at least in conjunction with indexing engine 206. In this regard, the search index may be queried using the descriptive feature vector for the search product to identify one or more result images from the search index.

In some configurations, a trained classifier may be used to identify the category of the search product, and the category of the search product may be used to provide result images from the search index. In some instances, matching result images are returned from the search index by identifying products with a category matching the category of the search product. For example, if the search product is a shirt, images containing shirts are returned. In other instances, complementary result images are returned from the search index by identifying products with categories complementary to the category of the search product. For example, if the search product is a shirt, images containing pants are returned. Furthermore, the category of the search product and the descriptive feature vector of the search product may both be used to identify result images from the search index. As such, the identified category of a search product, descriptive feature vector of a search product, or any combination may be used to identify result images form the search index.

Search engine 208 may generate product recommendations 214 based on the result images determined by search engine 208. Product recommendations 214 may be provided as result images that contain one or more products. Product recommendations 214 may contain a set of any number of product images from the search index that correspond and/or match with results provided by search engine 210. In some embodiments, product recommendations 214 may contain isolated product images of primary products. In other embodiments, product recommendations 214 may contain images of models wearing the primary product along with other products that are similar, complement, correspond, match, or otherwise associate with the primary product.

Figure 3:
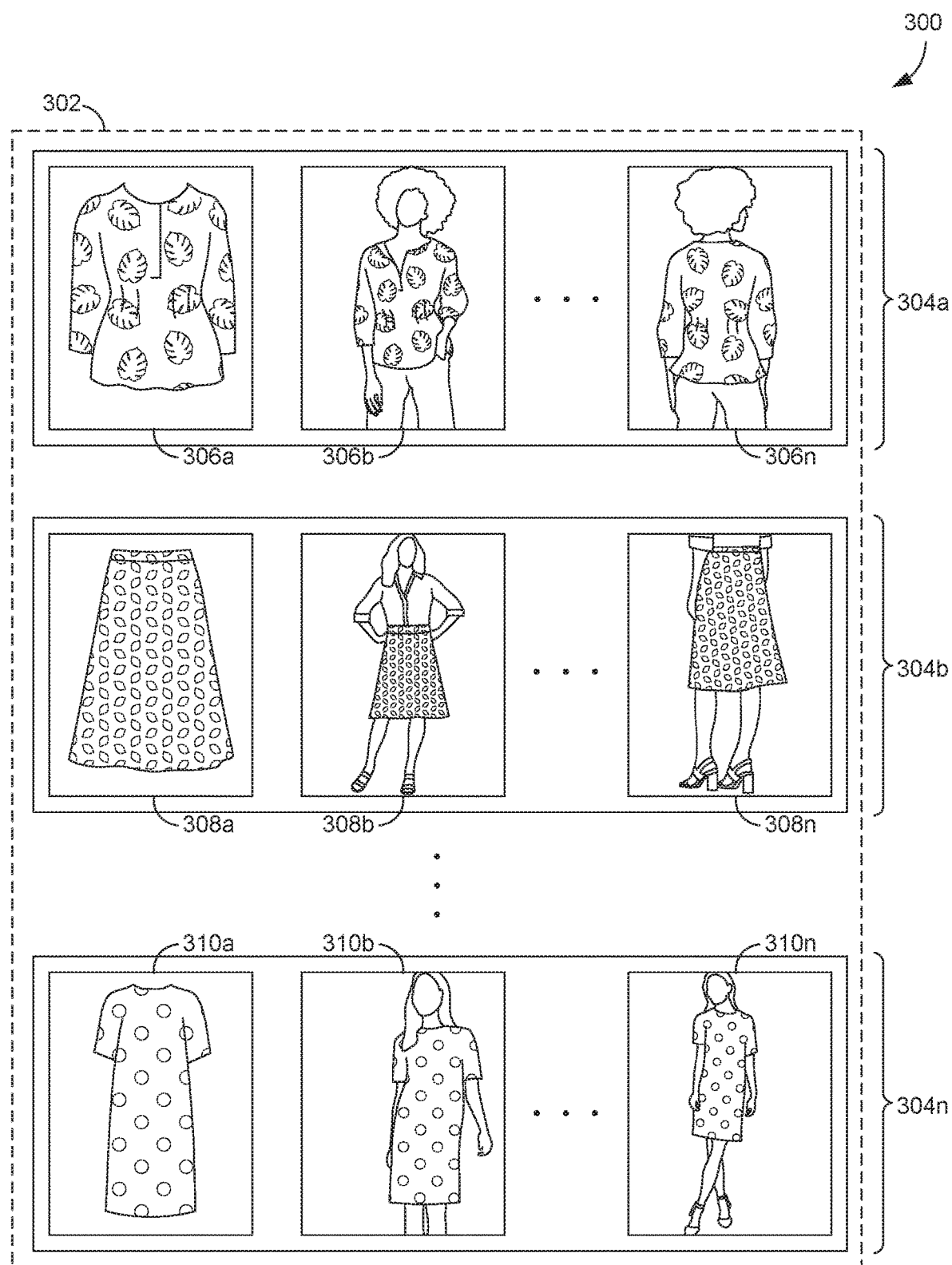
FIG. 3 is a block diagram showing exemplary product image sets, in accordance with embodiments of the present invention.

Referring now to FIG. 3, a block diagram is provided showing exemplary product image sets, in accordance with embodiments of the present invention. In some embodiments, a product image catalog 302 may contain any number of product image sets. For example, product catalog 302 may contain product image sets 304a through 304n which may be used as input into product recommendation system 204 as discussed in conjunction with FIG. 2. In other embodiments, product image sets 304a through 304n may be isolated and not contained in product image catalog 302. In this way, any number of product image sets may be used by product recommendation system 204 regardless of whether they are included in a product catalog.

In some embodiments, product image catalog 302 may include product images binned by product IDs in any number of product image sets. Each product ID may correspond to one of the product image sets 304a through 304n. For example, product image sets 304a through 304n may each contain any number of product images with an associated product ID. Product image set 304a may contain any number of product images 306a, 306b, through 306n; product image set 304b includes products image 308a, 308b, through 308n; and product image set 304 includes product images 310a, 310b, through 310n. Each product image set, contains a combination of at least one isolated product image and images of models wearing the product among other products and is associated with a product ID. For example, each product image 306a through 306n of product image set 304 will contain either an isolated image of the product with a product ID of 32, or, an image of a model wearing the product associated with product ID 32 along with any other product or combination of products such as jeans, pants, shoes, etc. In some embodiments, the product ID that binds a product image set is identified as the primary product of the image set.

Figure 4:
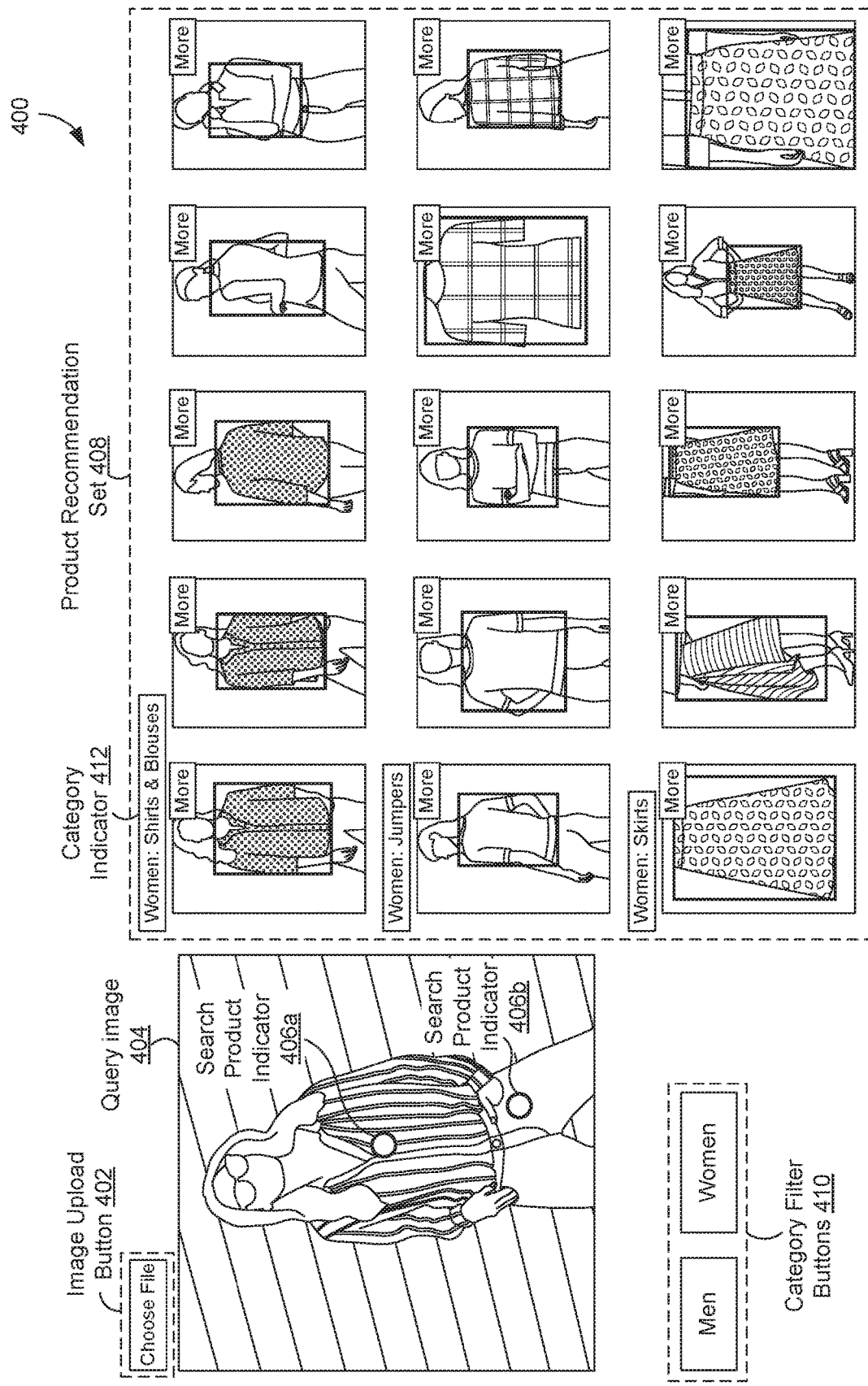
FIG. 4 is an exemplary user interface for providing product recommendations, in accordance with embodiments of the present invention.

Turning now to FIG. 4, an exemplary user interface 400 for providing product recommendations is illustrated, in accordance with embodiments of the present invention. Product recommendation user interface 400 illustrates an example of product recommendations provided as images using product recommendation system 204 as described at least in FIG. 2. In some embodiments, image upload button 402 may be used to upload a query image 404. A user may select image upload button 402 to upload a query image 404, in any suitable format, containing one or more products. For example, query image 404 may be an image of a mannequin, model, and/or person wearing a particular outfit with multiple products. In other embodiment, query image 404 may be automatically uploaded from a website. In this way, a retailer, website operator/administrator, application operator/administrator, or other any other person can display search results based on the product a user is currently viewing on a webpage.

After query image 404 is uploaded, the query image 404 may be analyzed to determine how many products are in the search product image. The products identified in query image 404 are labeled with user-selectable search product indicators 406. In embodiments, there may be more than one search product indicator 406 indicating multiple products that may be selected in order to provide product recommendations. In some embodiments, a user may select a search product indicator 406 to indicate the search product that is used to provide product recommendation set 408. For example, query image 404 may contain search product indicators 406a and 406b. Search indicator 406a indicates a shirt in query image 404 that may be selected in order to provide search results based on the selected shirt. The result images provided in product recommendation set 408 will be based on the search product indicated by one of the search product indicators.

Product recommendation set 408 can include any number of result images. Result images may be organized, arranged, presented, and/or displayed in any suitable format. The images in product recommendation set 408 contain products that are similar to, complement, correspond, match, or otherwise associate with the search product indicated from query image 404. In some embodiments, a product recommendation set 408 includes result images located using query image 404 in conjunction with at least the product recommendation system as described in FIG. 2.

In some embodiments, product recommendation set 408 can include result images containing products that are organized, arranged, presented, and/or displayed according to associated categories of the product recommendations. Category filter buttons 410 can be any buttons that adjust the result images displayed in product recommendation set 408 based on the selected category filter button. For example, if the category filter button 410 labeled as "Women" is selected, then product recommendation set 408 will include result images for products associated with "Women."

The product images in product recommendation set 408 can further be organized, arranged, presented, and/or displayed according to other associated categories of the products in the result images. Category indicator 412 indicates various categories of products in the result images of product recommendation set 408. For example, there may be a row of result images for women that all have an associated category of "Women: Shirts & Blouses." As another example, there may be a row of result images for women arranged into products recommendation images with the associated category of "Women Jumpers." The categories of the product recommendations are determined by product recommendation system 204 as described in FIG. 2. As such, the products in the result images in product recommendation set 408 are similar to, complement, correspond, match, or otherwise associate with the search product indicated in query image 404 and may be organized, arranged, presented, and/or displayed according to associated categories.

Figure 5:
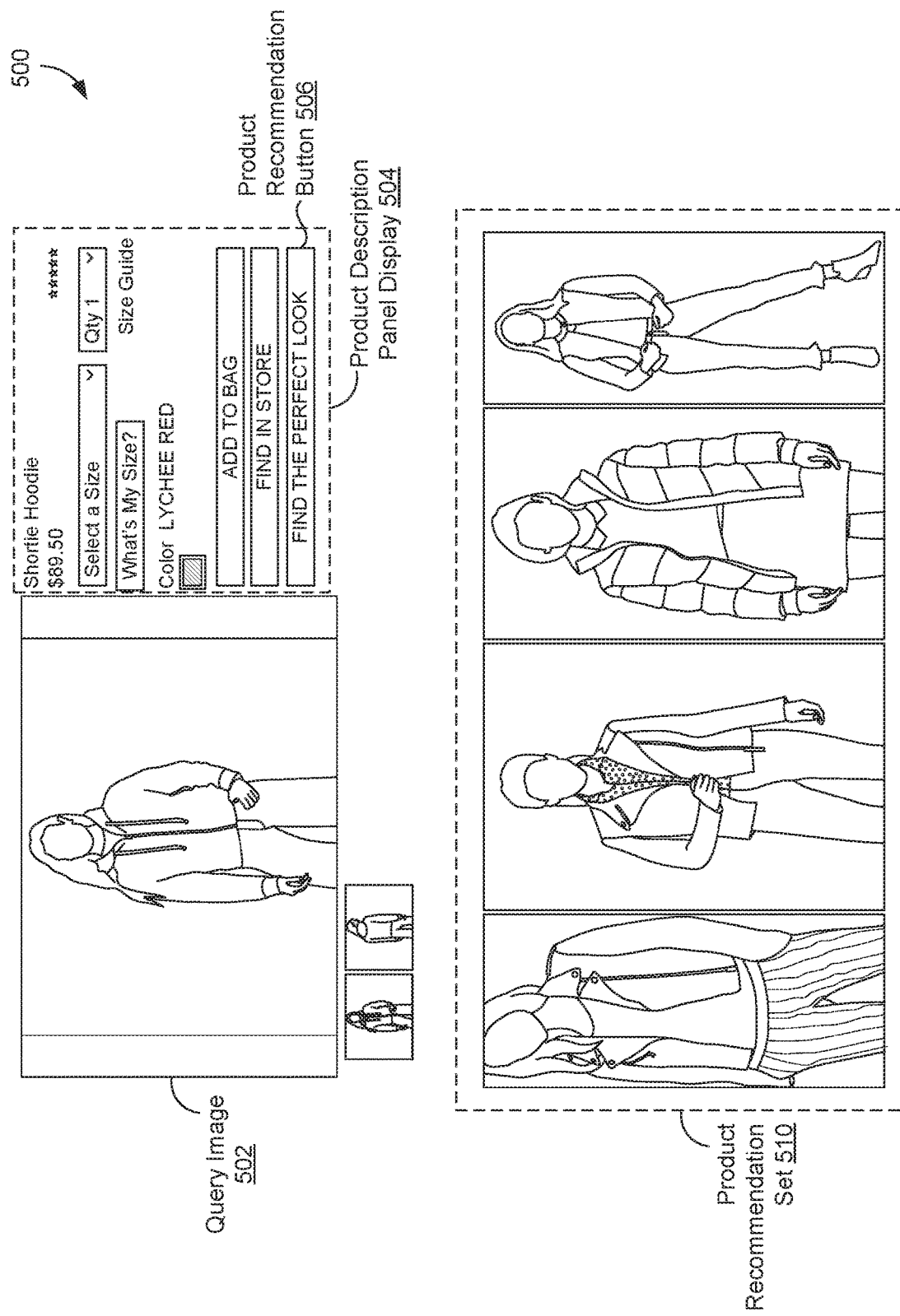
FIG. 5 is another exemplary user interface for providing product recommendations, in accordance with embodiments of the present invention.

Referring now to FIG. 5, another exemplary user interface 500 for providing product recommendations is illustrated, in accordance with embodiments of the present invention. Product recommendation user interface 500 illustrates an example of a product recommendation set 510 containing outfits that are recommended using product recommendation system 204 as described in FIG. 2. User interface 500 may be displayed, provided, and/or presented on any website that displays products for viewing and/or purchase. For example, query image 502 may be an image of a model wearing one or more products. In some embodiments, query image 502 is an image uploaded onto a webpage of a retailer's website. The product may be further described in product description panel 504. Product description panel 504 can include any information about a product in query image 502. As an example, product description panel 504 may include the name of a product, pricing information, sizing information, quantity information, color information, etc. of a product in query image 502.

In embodiments, product description panel 504 may also include buttons that further perform certain actions. For example, there may be an "ADD TO BAG" button that places the product in an online shopping bag for later purchase. In some embodiments, product description panel 504 may include a product recommendation button 506. Product recommendation button 506 can be any button that, when selected, uses product recommendation system 204 as discussed in conjunction with FIG. 2 to provide result images containing products that are similar to, complement, correspond, match, or otherwise associate with the product, or products, in query image 502. In some embodiments, there may be more than one product in query image 502. Product recommendations may be provided that are based on the product described in product description panel 504.

The resulting product recommendation set 510 can contain any number of result images. For example, product recommendation set 510 may contain images of models wearing outfits comprised of products that similar to, complement, correspond, match, or otherwise associate with one or more products of query image 502. Product recommendation set 510 may include result images that contain outfits with multiple products that are similar to, complement, correspond, match, or otherwise associate with the product searched for in query image 502.

Figure 6:
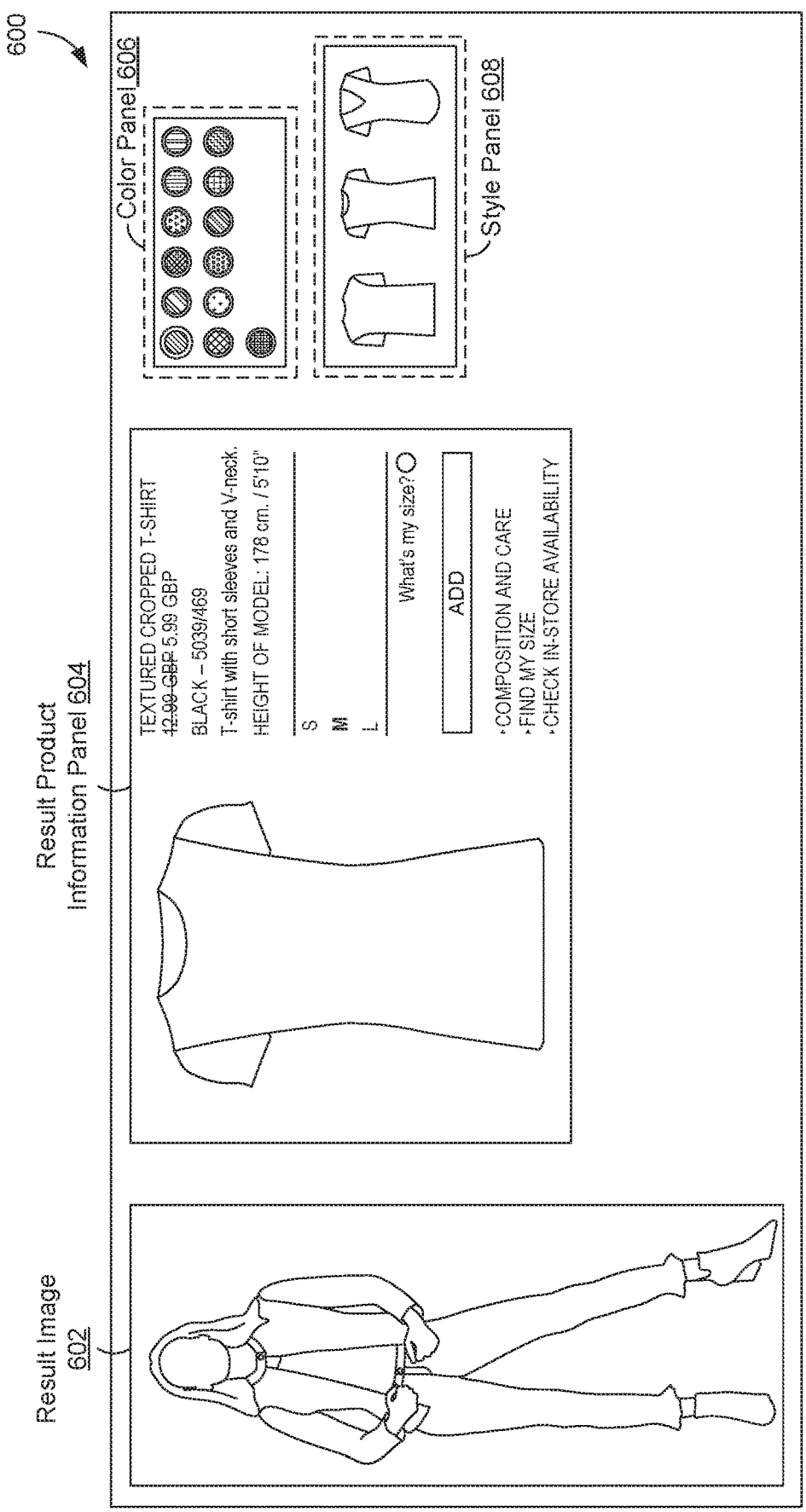
FIG. 6 is a further exemplary user interface for providing product recommendations, in accordance with embodiments of the present invention.

Turning now to FIG. 6, a further exemplary user interface 600 for providing product recommendations is illustrated, in accordance with embodiments of the present invention. Product recommendation user interface 600 illustrates an example of a result image 602 being selected and displayed from a product recommendation set as described at least in conjunction with FIGS. 4 and 5. For example, result image 602 may be any image provided as a result image. In some embodiments, result image 602 may be presented with other result images in a product recommendation set. Result image 602 may be selected in order to view additional information regarding products in the result image. For example, result product information panel 604 may contain any information associated with a product in result image 602. The information may be displayed automatically when a result image is selected. Information may include, but is not limited to, the name of a product, pricing information, sizing information, quantity information, color information, style information, etc. In some embodiments, there may be additional panels associated with result image 602. Color panel 606 and style panel 608 are two panels that may be used to change desired properties of a product in result image 602. For example, color panel 606 may display various colors that may be selected and the color of the t-shirt in result image 602 may change in accordance with the selected color. In another example, style panel 608 may display various styles that may be selected and the style of the t-shirt in result image 608 may change in accordance with the selected style. As such, product recommendations can be explored in-depth and searches may be refined so a user can easily find products they are interested in.

Example Flow Diagrams

Figure 7:
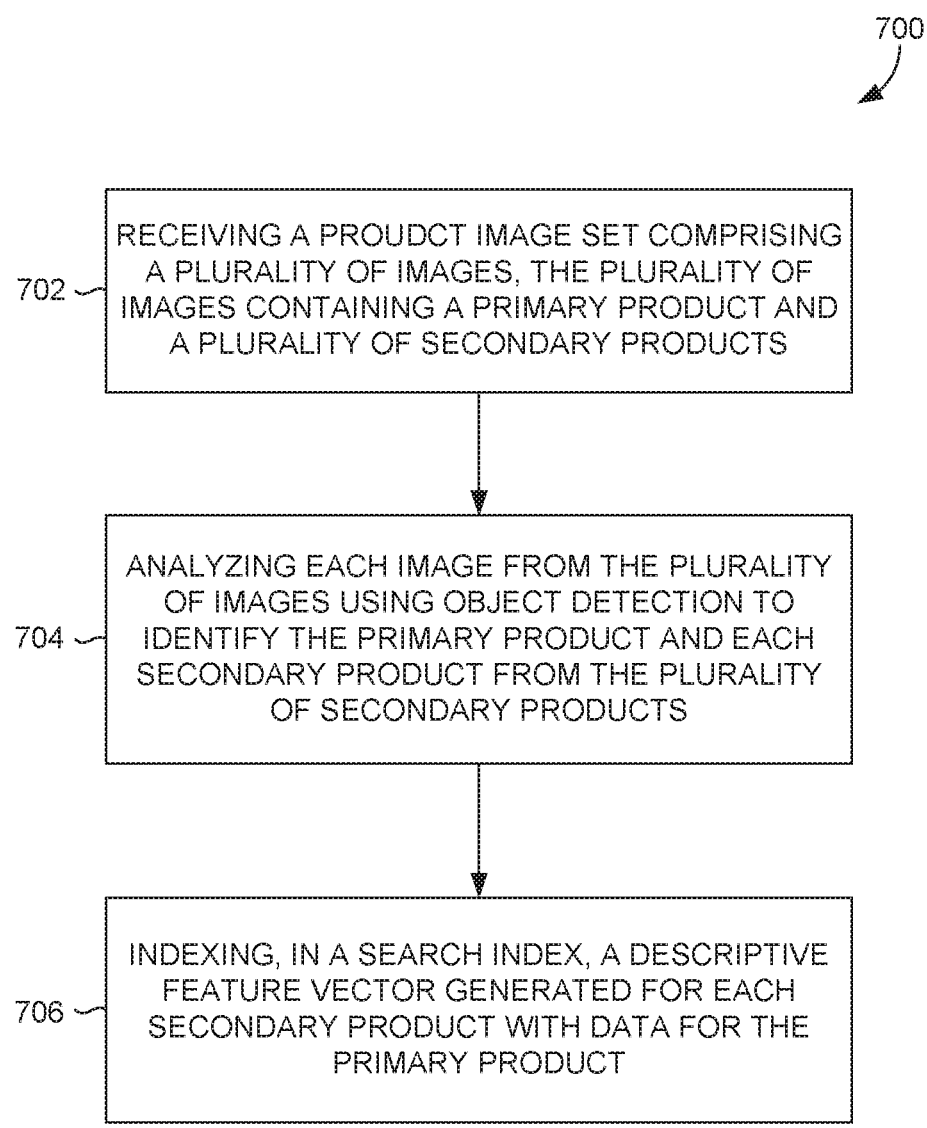
FIG. 7 is a flow diagram showing a method for providing product recommendations, in accordance with embodiments of the present invention.
Figure 8:
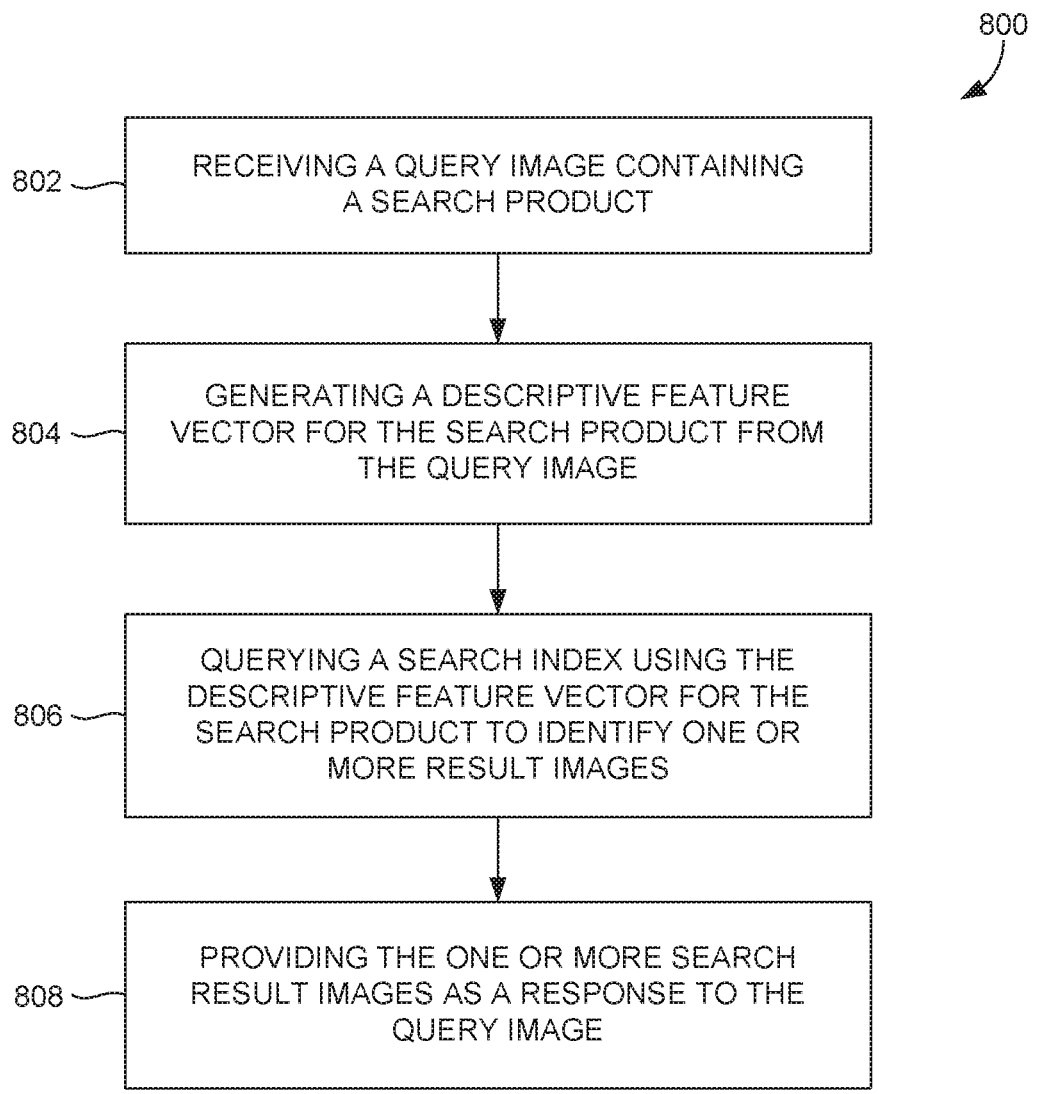
FIG. 8 is a flow diagram showing a method for providing product recommendations, in accordance with embodiments of the present invention.

With reference now to FIGS. 7 and 8, flow diagrams are provided illustrating methods 700 and 800 for providing product recommendations. Each block of methods 700 and 800, and any other methods described herein, comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The methods 700 and/or 800 may be implemented by product recommendation system 204 as described in conjunction with at least FIGS. 1-6.

Turning initially to FIG. 7, FIG. 7 illustrates a method 700 for providing product recommendations, in accordance with embodiments described herein. Method 700 can be performed, for instance, by indexing engine 206 of FIG. 2. Initially, as shown at block 702, a product image set comprising a plurality of images is received, the plurality of images containing a primary and a plurality of secondary products. At block 704, each image from the plurality of images is analyzed using object detection to identify the primary product and each secondary product from the plurality of secondary products. The primary product may be identified by locating, within the product image set, an isolated product image with a single object identified as the primary product. The secondary products can be identified by locating the images in the product image set that contain objects that do not match the primary product. In some configurations, a trained classifier is used to identify the categories of primary and/or secondary products and index the category data in the search index with the corresponding products. As shown, at block 706, a descriptive feature vector generated for each secondary product is indexed, in a search index, with data for the primary product. The descriptive feature vector can be generated based on the category of the corresponding secondary product. In some configurations, the descriptive feature vector of each secondary product can serve as the primary key of the search index.

Referring now to FIG. 8, FIG. 8 illustrates a method 800 for providing product recommendations, in accordance with embodiments described herein. Method 800 can be performed, for instance, by search engine 208 of FIG. 2. Initially at block 802, a query image containing a search product is received. In some configurations, the query image contains a plurality of products that may be selected as the search product. At block 804, a descriptive feature vector for the search product from the query image is generated. As shown, at block 806, a search index is queried to identify one or more result images using the descriptive feature vector for the search product. A descriptive feature vector for the search product may be used to identify descriptive feature vectors of secondary products in the search index matching the descriptive feature vector of the search product. At block, 808 the one or more search result images are provided as a response to the query image. The result images can include one or more primary products associated with the descriptive feature vectors of the secondary products matching the descriptive feature vector of the search product. In some configurations, the category of the search product may be identified and used to identify result images. The result images can contain a product with a category matching and/or complementary to the category associated with the search product.

Example Operating Environment

Figure 9:
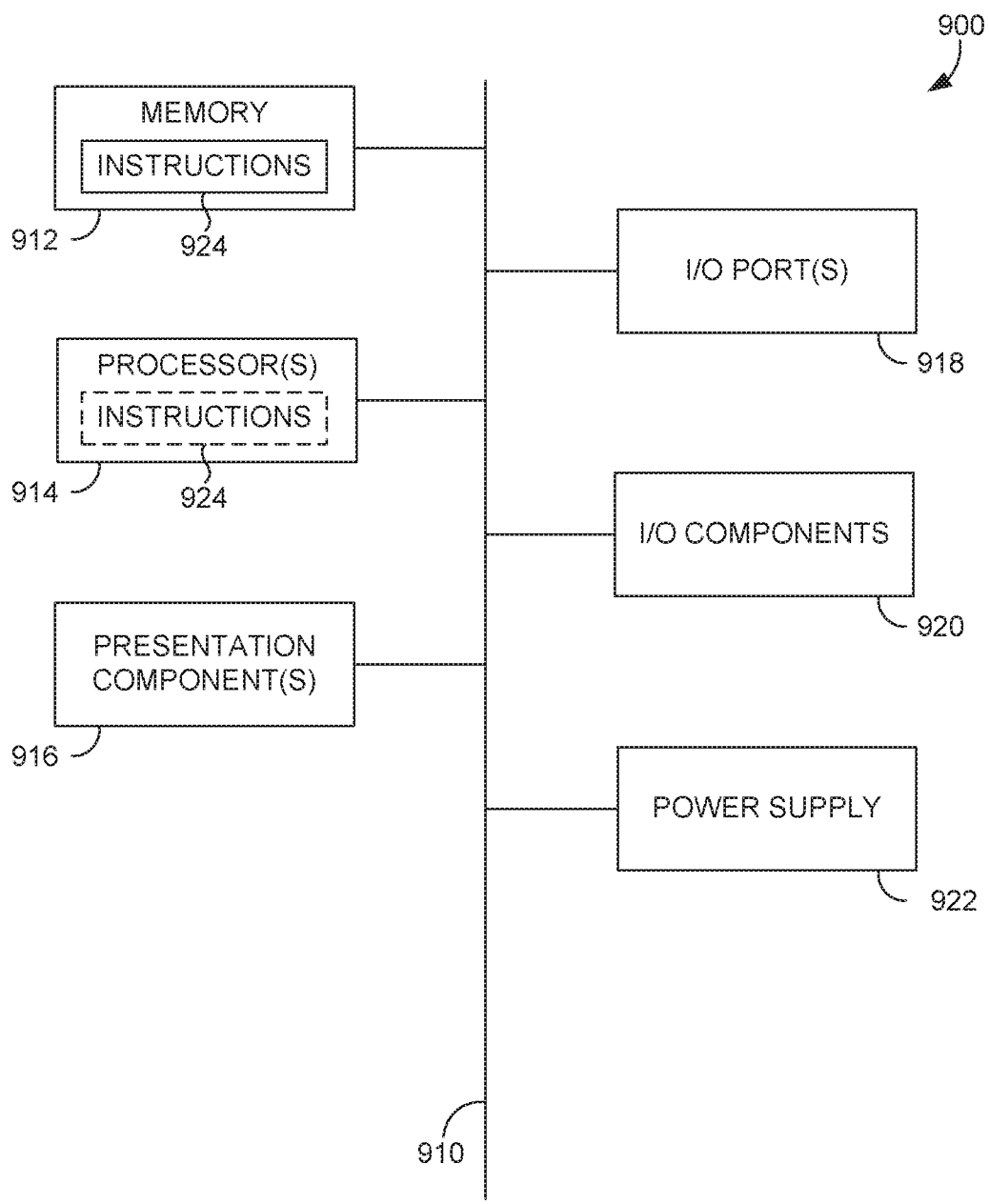
FIG. 9 is a block diagram of an exemplary operating environment in which embodiments of the present invention may be employed.

Having described an overview of embodiments of the present invention, an exemplary operating environment in which embodiments of the present invention may be implemented is described below in order to provide a general context for various aspects of the present invention. Referring now to FIG. 9 in particular, an exemplary operating environment for implementing embodiments of the present invention is shown and designated generally as computing device 900. Computing device 900 is but one example of a suitable computing environment and is not intended to suggest any limitation as to the scope of use or functionality of the invention. Neither should computing device 900 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 9, computing device 900 includes bus 910 that directly or indirectly couples the following devices: memory 912, one or more processors 914, one or more presentation components 916, input/output (I/O) ports 918, input/output components 920, and illustrative power supply 922. Bus 910 represents what may be one or more busses (such as an address bus, data bus, or combination thereof). Although the various blocks of FIG. 9 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer-storage media in the form of volatile and/or nonvolatile memory. The memory may be removable, non-removable, or a combination thereof. Exemplary hardware devices include solid-state memory, hard drives, optical-disc drives, etc. Computing device 900 includes one or more processors that read data from various entities such as memory 912 or I/O components 920. Presentation component(s) 916 present data indications to a user or other device. Exemplary presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc. The I/O components 920 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 900. Computing device 900 may be equipped with depth cameras, such as stereoscopic camera systems, infrared camera systems, RGB camera systems, touchscreen technology, and combinations of these, for gesture detection and recognition. Additionally, the computing device 900 may be equipped with accelerometers or gyroscopes that enable detection of motion. The output of the accelerometers or gyroscopes may be provided to the display of computing device 900 to render immersive augmented reality or virtual reality.

Embodiments described herein support providing product recommendations. The components described herein refer to integrated components of product recommendation system. The integrated components refer to the hardware architecture and software framework that support functionality using the product determination system. The hardware architecture refers to physical components and interrelationships thereof and the software framework refers to software providing functionality that can be implemented with hardware embodied on a device.

The end-to-end software-based product recommendation system can operate within the product recommendation components to operate computer hardware to provide product recommendation system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the product recommendation system components can manage resources and provide services for the product recommendation system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media having computer-useable instructions that, when used by one or more computing devices, cause the one or more computing devices to perform operations comprising:

receiving an image set comprising a plurality of images, the plurality of images comprising a plurality of objects including a primary object and one or more secondary objects, each of the images from the image set including the primary object and a portion of the images from the image set including the one or more secondary objects with the primary object;

analyzing, by an object detector, each image from the plurality of images to detect the plurality of objects in the plurality of images;

determining that a first object in a first image from the image set is the primary object based on the object detector detecting only the first object in the first image;

determining that one or more other objects from the plurality of objects comprise the one or more secondary objects based on the one or more other objects not matching the first object;

generating a feature vector for each secondary object identified from the plurality of objects;

storing, in a search index on a storage medium, the feature vector for each secondary object as a primary key of the search index;

storing, in the search index, data for the primary object in association with the feature vector for each secondary object in the search index;

receiving a query image containing a search object;

generating a feature vector for the search object from the query image;

identifying, by querying the primary key of the search index using the feature vector for the search object, the feature vector for a first secondary object from the one or more secondary objects as matching the feature vector for the search object;

retrieving, from the search index, an image of the primary object based on identifying the feature vector for the first secondary object as matching; and providing the image of the primary object as a response to the query image.

2. The one or more computer storage media of claim 1, wherein the operations further comprise:

identifying a category of the primary object using a classifier trained on object images; and indexing, in the search index, data identifying the category of the primary object.

3. The one or more computer storage media of claim 1, wherein each secondary object is identified by:

locating one or more images in the image set that each contain two or more objects; and identifying, for each image that contains two or more objects, each object that does not match the primary object as a secondary object.

4. The one or more computer storage media of claim 1, wherein the operations further comprise:

identifying a category of each secondary object using a classifier trained on object images; and indexing, in the search index, data identifying the category of each secondary object.

5. The one or more computer storage media of claim 4, the operations further comprising generating the feature vector for each secondary object based on the category for each secondary object.

6. The one or more computer storage media of claim 1, wherein the response to the query image comprises a plurality of search result images that include the image of the primary object.

7. The one or more computer storage media of claim 6, wherein the operations further comprise identifying a category of the search object using a classifier trained on object images, and wherein the plurality of search result images are identified using the category of the search object.

8. The one or more computer storage media of claim 7, wherein the plurality of search result images each contains an object with a category matching the category of the search object.

9. The one or more computer storage media of claim 7, wherein the plurality of search result images each contains an object with a category complementary to the category of the search object.

10. A computerized method, the method comprising:

analyzing, by an object detector, each image from an image set to detect a plurality of objects in the image set;

determining that a first object in a first image from the image set is a primary object based on the object detector detecting only the first object in the first image;

determining that a second object in a second image from the image set is a secondary object based on the second object not matching the first object;

storing, in a search index on a storage medium, data associating the first object with the second object;

receiving a query image containing a search object;

generating a feature vector for the search object from the query image;

querying the search index using the feature vector for the search object to identify the data associating the first object with the second object based on a first feature vector for the first object or a second feature vector for the second object; and providing an image of the first object or an image of the second object as a response to the query image.

11. The computerized method of claim 10, wherein the query image contains a plurality of objects, and a first object from the plurality of objects in the query image is selected as the search object.

12. The computerized method of claim 10, wherein querying the search index using the feature vector for the search object comprises identifying feature vectors of one or more other secondary objects matching the feature vector of the search object.

13. The computerized method of claim 12, wherein the method further comprises providing one or more other search result images for one or more other primary objects associated in the search index with the feature vectors of the one or more other secondary objects matching the feature vector of the search object.

14. The computerized method of claim 10, wherein the method further comprises:

identifying a category of the search object using a classifier trained on object images; and providing one or more other search result images using the category of the search object.

15. The computerized method of claim 14, wherein the one or more other search result images each contain an object with a category matching the category of the search object.

16. The computerized method of claim 14, wherein the one or more other search result images each contain an object with a category complementary to the category of the search object.

17. A computer system comprising:

one or more processors; and one or more computer storage media storing computer-useable instructions that, when used by the one or more processors, cause the one or more processors to perform operations comprising:

determining, by an object detector, that a first object in each of a plurality of images of an image set comprises a primary object of the image set based on the object detector identifying only the first object in at least one of the plurality of images;

determining, by the object detector, that each object in the plurality of images that does not match the primary object comprises a secondary object of the image set;

storing, in a search index, a feature vector for each of the plurality of secondary object as a primary key of the search index and information identifying the primary object in association with each feature vector for the plurality of secondary objects;

querying the primary key of the search index using a feature vector generated from a search object in a query image to identify a record for a first secondary object from the plurality of objects; and providing one or more search results that include an image of the primary object based on identifying the record for the first secondary object.

\* \* \* \* \*